(12) United States Patent
Brazeau

(10) Patent No.: US 11,076,137 B1
(45) Date of Patent: Jul. 27, 2021

(54) MODIFYING PROJECTED IMAGES

(71) Applicant: Amazon Technologies, inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 62 days.

(21) Appl. No.: 15/186,987

(22) Filed: Jun. 20, 2016

(51) Int. Cl.
| | |
|---|---|
| H04N 9/31 | (2006.01) |
| G09G 5/02 | (2006.01) |
| G03B 21/60 | (2014.01) |
| G09G 5/10 | (2006.01) |
| G06K 9/00 | (2006.01) |

(52) U.S. Cl.
CPC ........... *H04N 9/3182* (2013.01); *G03B 21/60* (2013.01); *G06K 9/00369* (2013.01); *G09G 5/02* (2013.01); *G09G 5/10* (2013.01); *H04N 9/3185* (2013.01)

(58) Field of Classification Search
CPC ...... H04N 9/3182; H04N 9/318; G03B 21/60; G06K 9/00369; G09G 5/02; G09G 5/10
See application file for complete search history.

(56) References Cited

U.S. PATENT DOCUMENTS

| | | | |
|---|---|---|---|
| 8,280,547 B2 | 10/2012 | D'Andrea et al. | |
| 8,423,431 B1* | 4/2013 | Rouaix | B65G 1/1373 705/28 |
| 9,087,314 B2 | 7/2015 | Hoffman et al. | |
| 2005/0117132 A1* | 6/2005 | Agostinelli | H04N 5/7416 353/122 |
| 2008/0062123 A1* | 3/2008 | Bell | G06F 3/0425 345/156 |
| 2010/0177929 A1* | 7/2010 | Kurtz | H04N 9/3161 382/103 |
| 2012/0143427 A1* | 6/2012 | Hoffman | G06Q 10/087 701/23 |
| 2012/0299876 A1* | 11/2012 | De Leon | G06F 3/04883 345/175 |
| 2013/0076898 A1* | 3/2013 | Philippe | H04N 7/18 348/143 |
| 2013/0302132 A1* | 11/2013 | D'Andrea | G06Q 10/08 414/807 |
| 2013/0335302 A1* | 12/2013 | Crane | H04N 5/2354 345/8 |
| 2015/0015699 A1* | 1/2015 | Vieth | G06K 9/00624 348/135 |
| 2016/0274733 A1* | 9/2016 | Hasegawa | G06F 3/0488 |

* cited by examiner

*Primary Examiner* — Kee M Tung
*Assistant Examiner* — Khoa Vu
(74) *Attorney, Agent, or Firm* — Kilpatrick Townsend & Stockton LLP

(57) ABSTRACT

A projection management system is described. The projection management system may be configured to instruct an image projection device to project an image on a background. Sensor information and/or image information may be received that indicates an obstruction between the image projection device and the background. The projection management system may instruct the image projection device to project a modified image based on the obstruction.

20 Claims, 15 Drawing Sheets

MODIFYING PROJECTED IMAGES

BACKGROUND

A common image projection device (e.g., a video projector, an image projector, etc.) may create an image on a surface (e.g., a projection screen) by directing a light towards the surface through one or more lenses. In certain applications, the light may have a brightness value that exceeds multiple thousands of lumens.

BRIEF DESCRIPTION OF THE DRAWINGS

Various embodiments in accordance with the present disclosure will be described with reference to the drawings, in which.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the embodiment being described.

Examples described herein are directed to modifying projected images based on obstructions. In particular, the techniques are directed to identifying an obstruction located between an image projection device and a background, and modifying a projected image based on the obstruction. For example, in some applications a user may be required to perform tasks at the background while the image is being projected. As part of performing these tasks, the user may have her back to the image projection device, but may also, at times, turn and face the image projection device. Using the techniques described herein, it can be detected that the user is preparing to face the image projection device (e.g., in the process of turning her head). Based on this, the projected image can be modified to minimize or eliminate light being projected directly on the user's face. Such modifications can include projecting a slightly modified image that includes a blank space (e.g., a blacked-out region) that corresponds to the user's face. Similar modifications can be made even when the user is not facing the image projection device, and when the user faces the image projection device.

In a particular example, a projector may project an image on a portion of a mobile inventory holder including multiple bins. The image can be used to direct the attention of an operator to a certain location on the inventory holder. For example, the image may highlight a particular bin in which is stored an item that the operator has been tasked with removing from the inventory holder. As the operator interacts with the inventory holder (e.g., to remove the item), the operator may, at times, be located within the projected light of the image. This can be uncomfortable to the operator, especially when the operator faces the projector. Using a camera, a set of cameras, and/or a set of sensors, information about the operator (e.g., orientation, size, position, etc.) may be determined, and the first image may be modified, based on the information, to minimize or eliminate instances of the operator being within the projected light of the image. Such modifications can include adding a blacked-out region to the image corresponding to the operator, adding a reduced-brightness region to the image corresponding to the operator, powering off the projector, projecting an entirely black-out image in place of the image, and other similar modifications.

Figure 1:
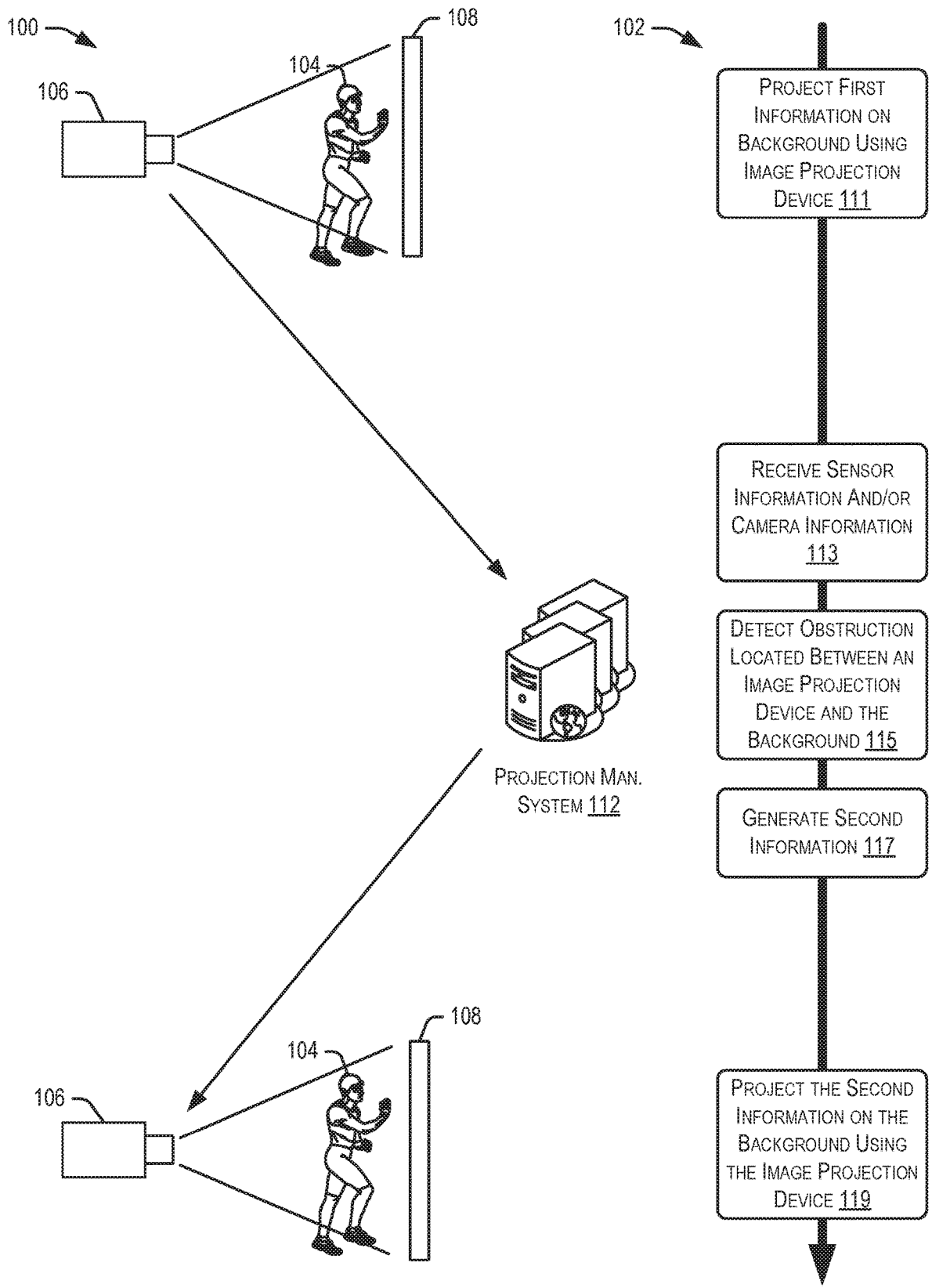
FIG. 1 illustrates an example block diagram depicting an example flow for implementing techniques relating to modifying projected images based on obstructions as described herein, according to at least one example.

FIG. 1 illustrates a simplified block diagram 100 depicting an example process 102 for implementing techniques relating to modifying projected images based on obstructions, according to at least one example. The diagram 100 can include a user 104 that is disposed between an image projection device 106 and a background 108. The image projection device 106 may be configured to project information in the form of images, video, and the like on the background 108. The background 108 may be any suitable surface capable of having information projected thereon. For example, the background 108 may include a face of an inventory holder configured to receive inventory items as part of an inventory management system, a common projection screen, and any other suitable surface.

The diagram 100 also includes a projection management system 112 that is configured to implement the techniques described herein. For example, the projection management system 112 may be configured to project images, receive information about the user 104 or other obstructions, and determine how to adjust the projected images to account for the presence of the user 104 or other obstructions.

The process 102 may begin at 111 by projecting first information on the background 108 using the image projection device 106. In some examples, the first information is determined by the projection management system 112 and an instruction is provided to the image projection device 106 to project the first information.

At 113, the projection management system 112 may receive sensor information and/or camera information. The sensor information and/or camera information may be collected while the first information is being projected. The sensor information and/or camera information may identify aspects of the user 104 and/or other items that are located between the image projection device 106 and the background 108.

At 115, the projection management system 112 may detect an obstruction located between the image projection device and the background. This can include using the sensor information and/or camera information to detect the obstruction and information about the obstruction. In some examples, an obstruction is an object that obstructs at least a portion of the first information from being projected on the background 108. In this example, the user 104 may be considered an obstruction.

Once the obstruction has been detected, the projection management system 112 may generate second information at 117. The second information may be a modified version of the first information in order to account for the obstruction detected at 115. In some examples, the second information is entirely different information from the first information.

At 119, the second information is projected on the background 108 using the image projection device 106. This can include the projection management system 112 sending an instruction to the image projection device 106 to project the second information.

Figure 2:
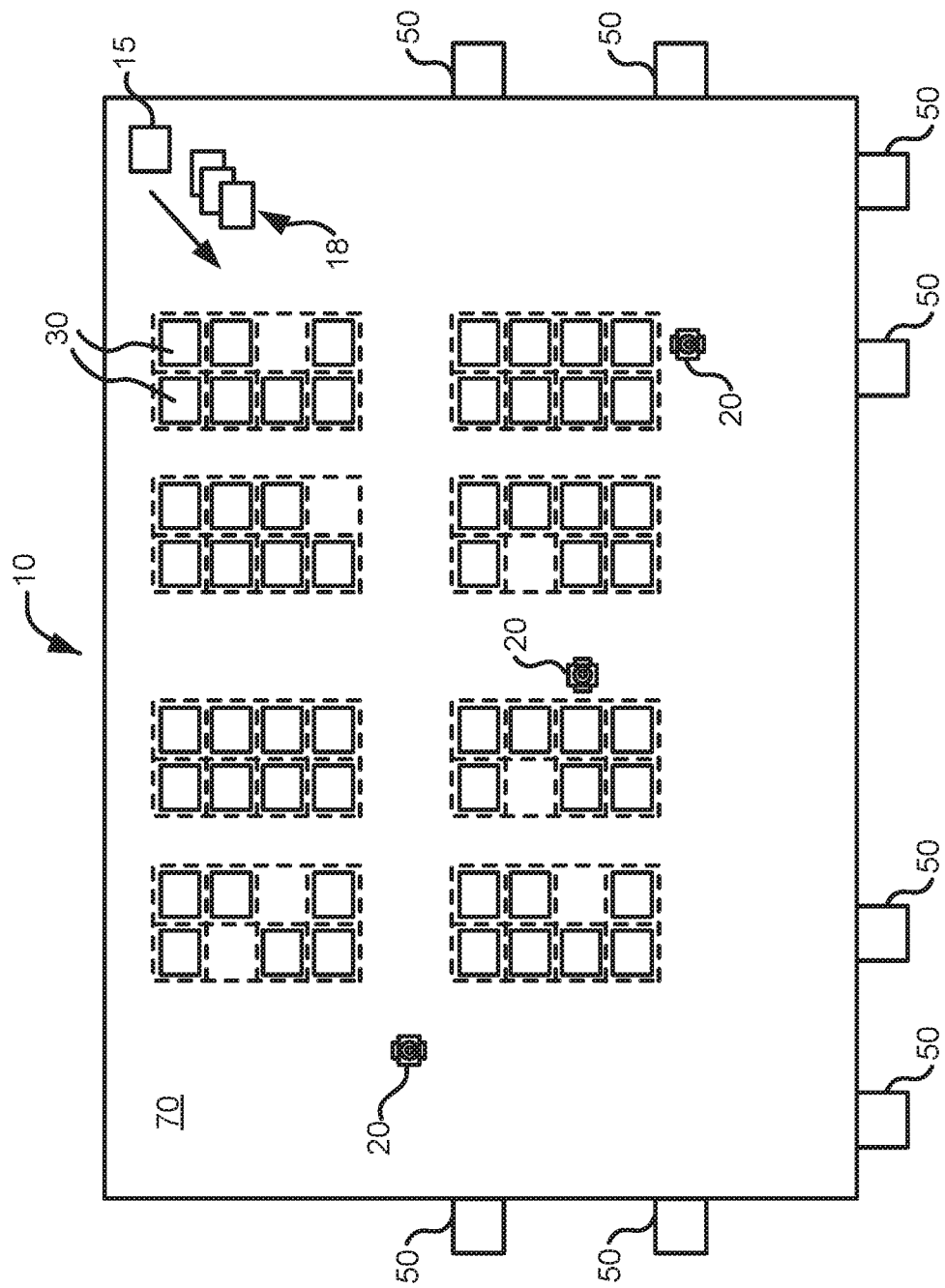
FIG. 2 illustrates components of an inventory system according to at least one example.

FIG. 2 illustrates the contents of an inventory system 10 in which techniques relating to modifying projected images based on obstructions can be implemented. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
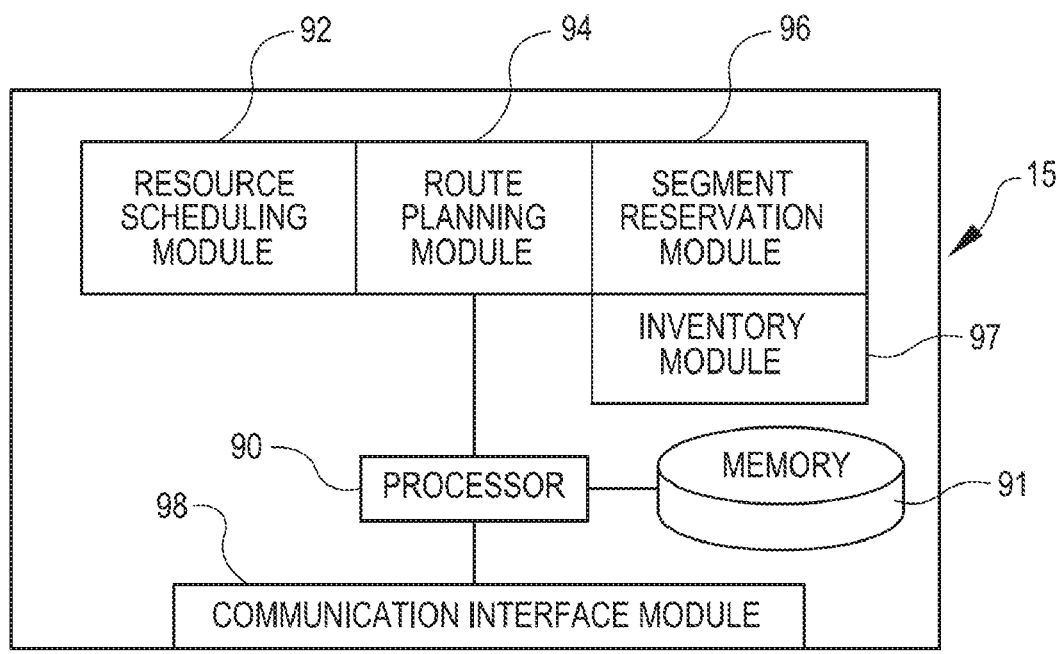
FIG. 3 illustrates in greater detail components of an example management module that may be utilized in particular examples of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
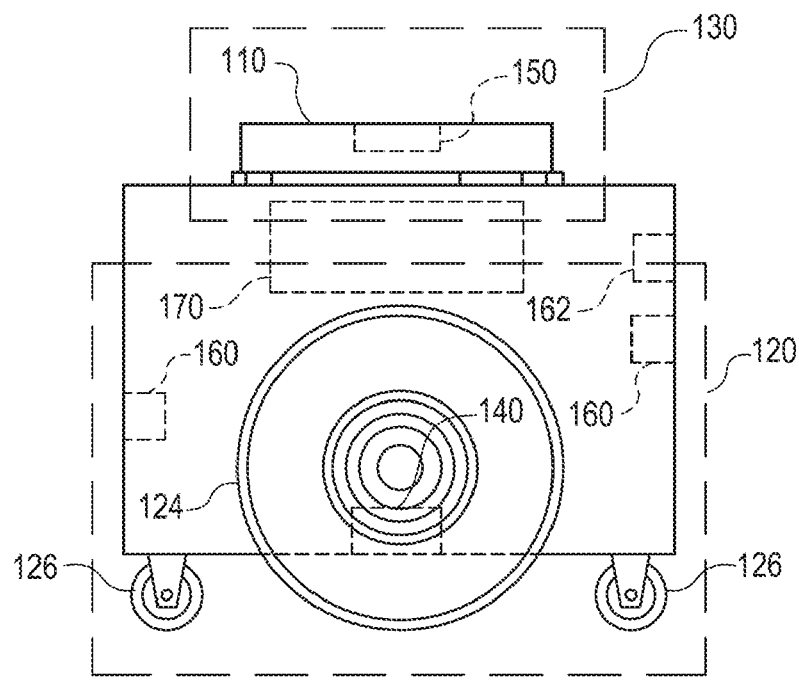
FIGS. 4 and 5 illustrate in greater detail an example mobile drive unit that may be utilized in particular examples of the inventory system shown in FIG. 2.
Figure 5:
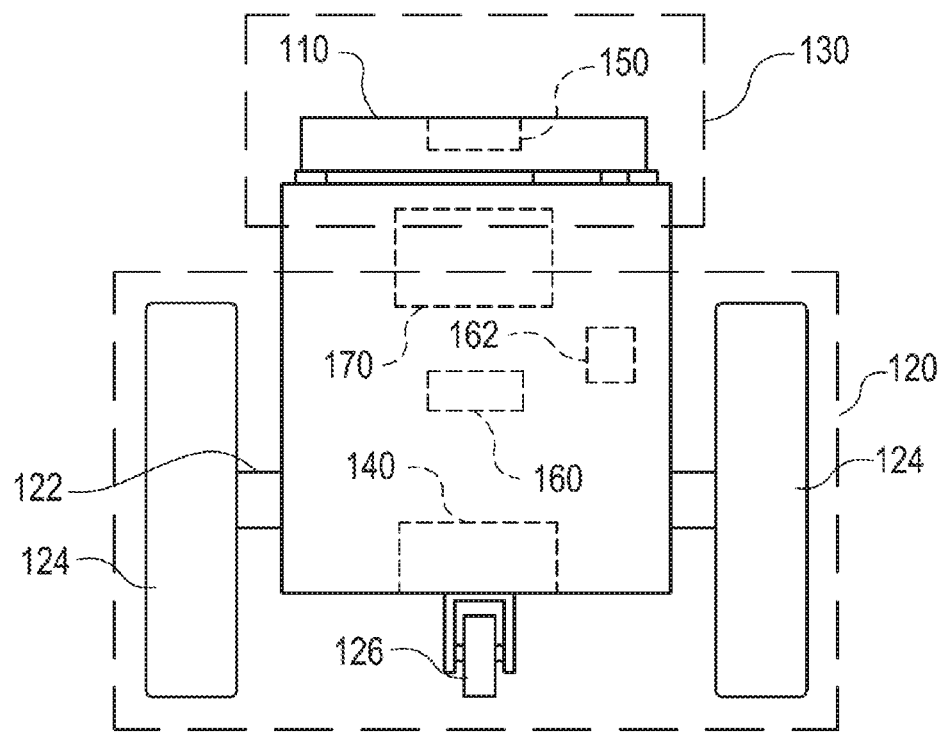

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
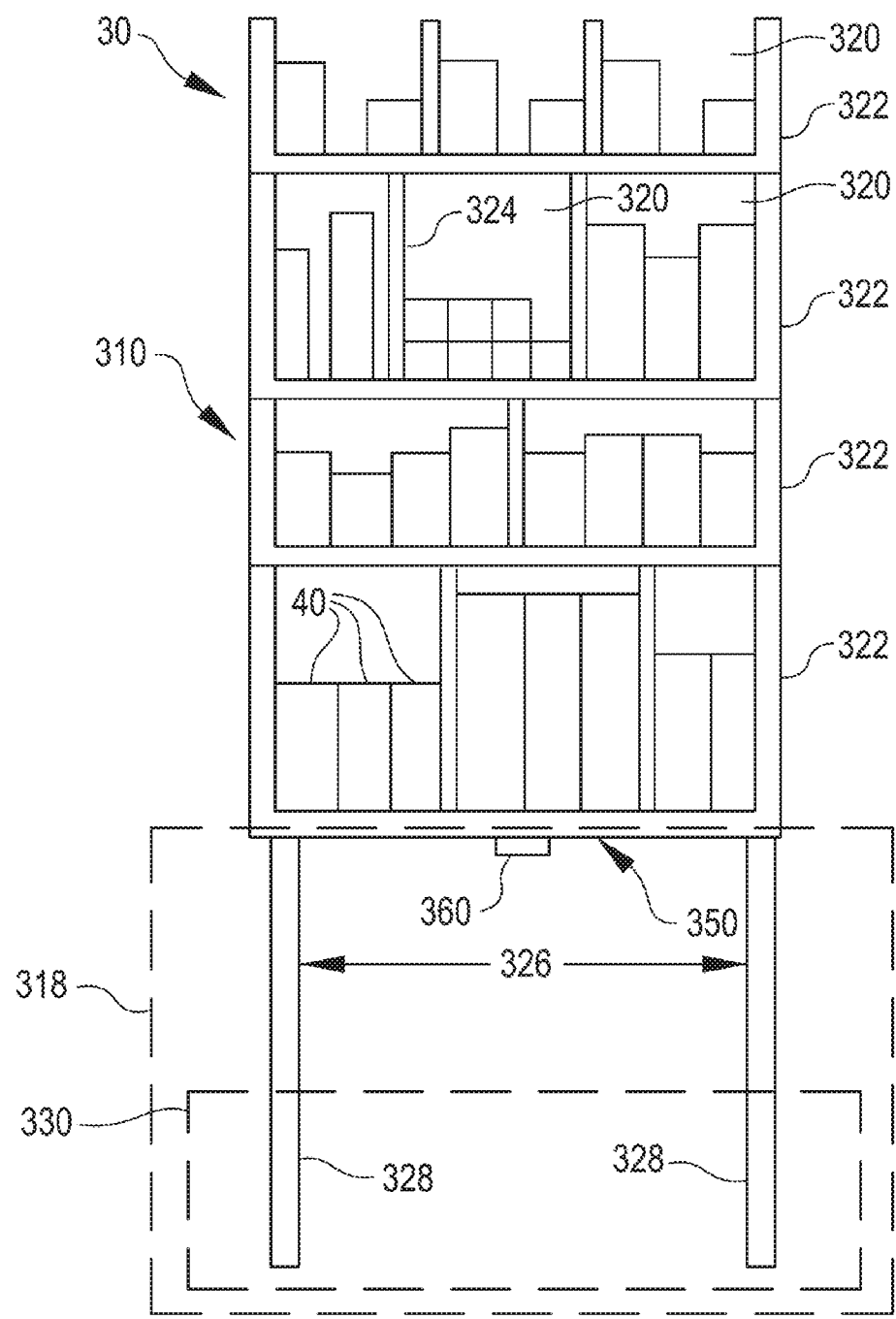
FIG. 6 illustrates in greater detail an example inventory holder that may be utilized in particular examples of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory compartments 320, each capable of holding inventory items 40. Inventory compartments 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory compartments 320 may be formed by a plurality of adjustable dividers 324 that may be moved to resize one or more inventory compartments 320. In alternative embodiments, frame 310 may represent a single inventory compartment 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory compartments 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

Figure 7:
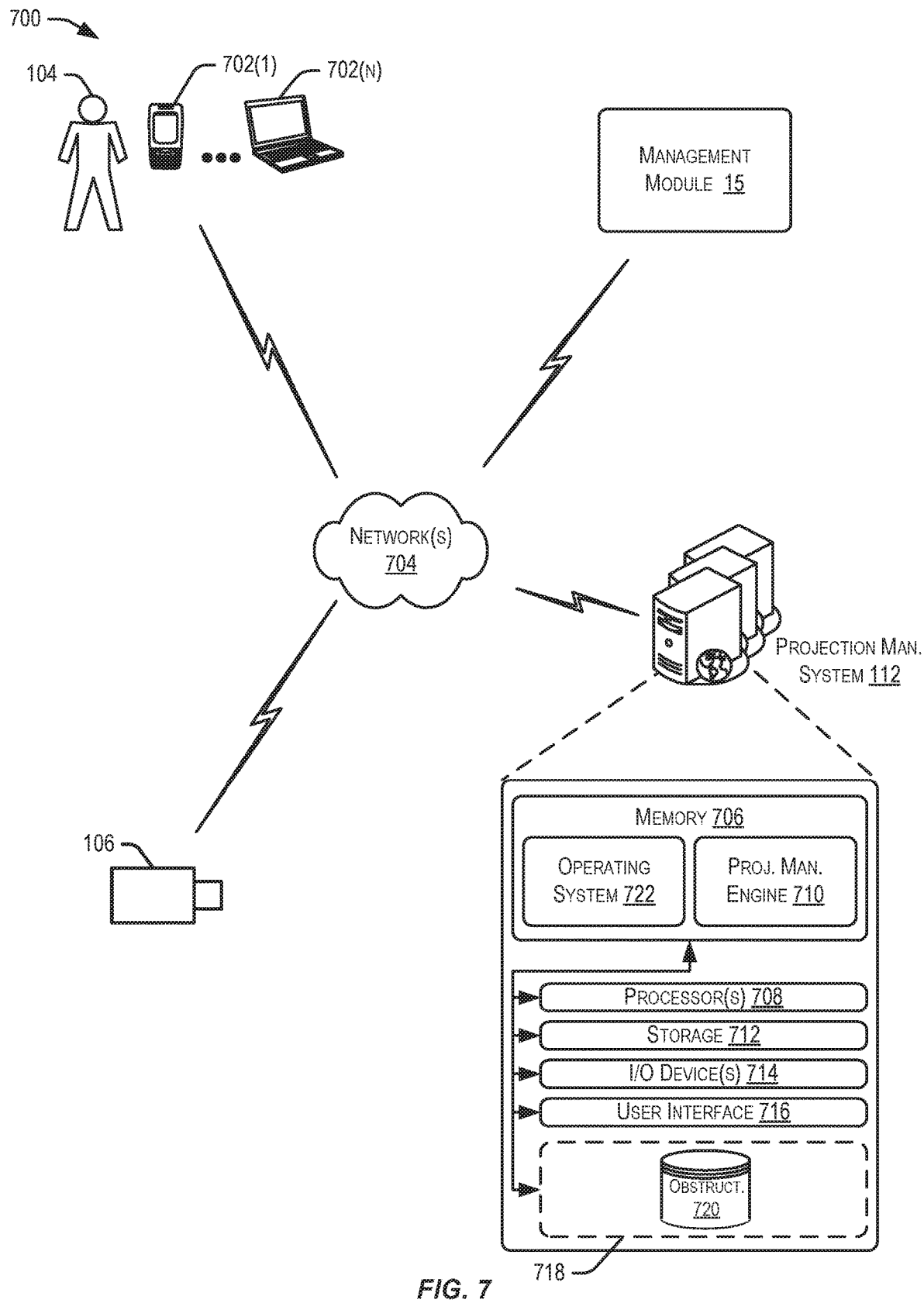
FIG. 7 illustrates an example architecture or system for implementing techniques relating to modifying projected images based on obstructions as described herein, according to at least one example.

FIG. 7 illustrates an example schematic architecture or system 700 for implementing techniques relating to modifying projected images based on obstructions, according to at least one example. The architecture 700 may include the management module 15, the projection management system 112, and one or more use devices 702(1)-702(n) (the "user devices 702") in communication with each other via one or more network(s) 704. The network 704 can include any appropriate network, including an intranet, the Internet, a cellular network, a local area network or any other such network or combination thereof. Components used for the architecture 700 may depend at least in part upon the type of network and/or environment selected. The network 704 may be proprietary or non-proprietary. The architecture 700 may be implemented as part of implementing the inventory system 10.

As discussed above, the management module 15 may be configured to manage the movement and operation of the mobile drive units 20. The projection management system 112 may be configured to manage the image projection device 106 and generally implement the techniques described herein. In some examples, the projection management system 112 may coordinate with an inventory management system that manages inventory. In some examples, the projection management system 112, the inventory management system, and the management module 15 work in concert to manage inventory.

The user device 702 can include any suitable user device configured to provide and/or receive data from the management module 15 and/or the projection management system 112. Examples of such devices include personal computers, handheld scanning devices, cell phones, handheld messaging devices, laptop computers, set-top boxes, personal data assistants, electronic book readers, and the like. Accordingly, the user device 702 may include memory for storing an operating system and/or modules, processors capable of accessing the memory for executing instructions, and an interface for communicating with the user 104 and/or other devices. The processors may include one or more general purpose computers, dedicated microprocessors, or other processing devices capable of communicating electronic information. Examples of the processor include one or more application-specific integrated circuits (ASICs), field programmable gate arrays (FPGAs), digital signal processors (DSPs) and any other suitable specific or general purpose processors. Computer-executable instruction, software or firmware implementations of the processor may include computer-executable or machine-executable instructions written in any suitable programming language to perform the various functions described.

The memory may include more than one memory and may be distributed. The memory may store program instructions that are loadable and executable on the processor, as well as data generated during the execution of these programs. Depending on the configuration and type of memory including the user device 702, the memory may be volatile (such as random access memory (RAM)) and/or non-volatile (such as read-only memory (ROM), flash memory, or other memory).

The projection management system 112 may include one or more computers, perhaps arranged in a cluster of servers or as a server farm. The memory and processors that make up these computers may be located within one computer or distributed throughout many computers as detailed herein. These servers may be configured to implement the techniques described herein, in addition to managing aspects of the inventory in the inventory system 10.

The projection management system 112 may include at least one memory 706 and one or more processing units (or processor(s)) 708. The processor 708 may be implemented as appropriate in hardware, computer-executable instructions, software, firmware, or combinations thereof. Computer-executable instruction, software or firmware implementations of the processor 708 may include computer-executable or machine-executable instructions written in any suitable programming language to perform the various functions described. The memory 706 may include more than one memory and may be distributed throughout the projection management system 112. The memory 706 may store program instructions (e.g., a projection management engine 710) that are loadable and executable on the processor(s) 708, as well as data generated during the execution of these programs. Depending on the configuration and type of memory included in the projection management system 112, the memory 706 may be volatile (such as random access memory (RAM)) and/or non-volatile (such as read-only memory (ROM), flash memory, or other memory). The projection management system 112 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some examples, the memory 706 may include multiple different types of memory, such as static random access memory (SRAM), dynamic random access memory (DRAM), or ROM. The memory 706 may also include an operating system 722 for interacting with the projection management system 112.

In some examples, the projection management system 112 may also include additional storage 712, which may include removable storage and/or non-removable storage. The additional storage 712 may include, but is not limited to, magnetic storage, optical disks, and/or tape storage. The disk drives and their associated computer-readable media may provide non-volatile storage of computer-readable instructions, data structures, program modules, and other data for the computing devices. The memory 706 and the additional storage 712, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture 700. The projection management system 112 may also include input/output (I/O) device(s) and/or ports 714, such as for enabling connection with a keyboard, a mouse, a pen, a voice input device, a touch input device, a display, speakers, a printer, or other I/O device.

In some examples, the projection management system 112 may also include a user interface 716. The user interface 716 may be utilized by an operator, or other authorized user to access portions of the projection management system 112. In some examples, the user interface 716 may include a graphical user interface, web-based applications, programmatic interfaces such as application programming interfaces (APIs), or other user interface configurations. The projection management system 112 may also include a data store 718. In some examples, the data store 718 may include one or more data stores, databases, data structures, or the like for storing and/or retaining information associated with the projection management system 112. For example, the data store 718 may include data structures, such as an obstruction database 720.

The obstruction database 720 may be used to retain information about obstructions and projection modifications made to account for the obstructions. This can include, for example, information about typical interactions of the users 104 with the background 108. This can also include calibration information for calibrating the image projection device 106.

The projection management engine 710 can include one or more modules, engines, components or the like configured to implement the techniques described herein. For example, the projection management engine 710 may include image and signal processing functionality for detecting obstructions and item tracking functionality for tracking movements and orientations of the obstructions. The projection management engine 710 may also include projection modification functionality for modifying projected information (e.g., images in the form of webpages, etc.) based on the obstructions. In some examples, the projection management engine 710 may be included in the projection management system 112, one of the user devices 702, and/or a combination thereof.

Figure 8:
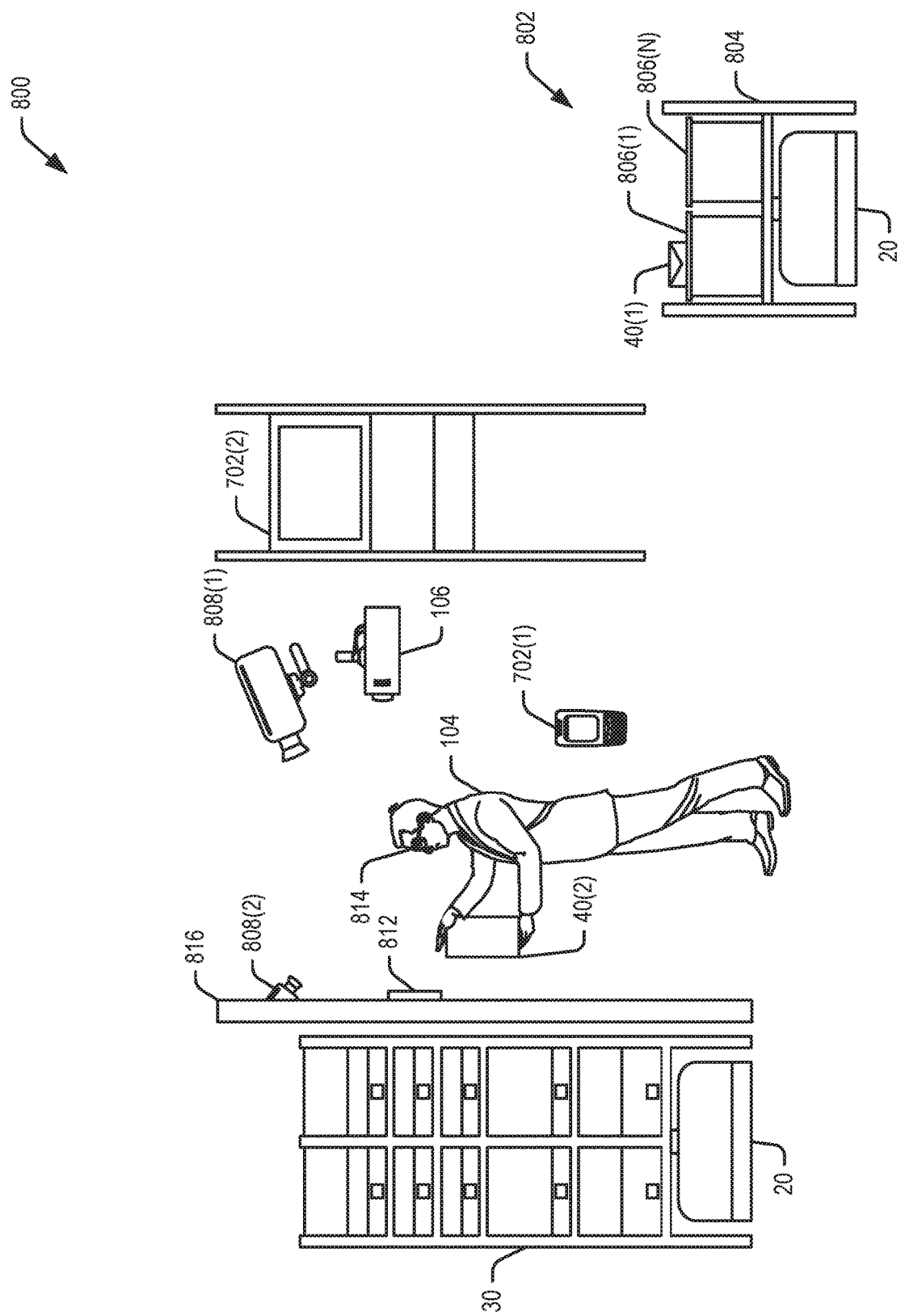
FIG. 8 illustrates an example inventory station at which techniques relating to modifying projected images based on obstructions as described herein can be implemented, according to at least one example.

FIG. 8 illustrates an example inventory station 800 for implementing techniques relating to modifying projected images based on obstructions, according to at least one example. The inventory station 800 can include the inventory holder 30 coupled to the mobile drive unit 20. The mobile drive unit 20 can be instructed to present any one of a plurality of sides of the inventory holder 30 to the user 104, the image projection device 106, and other objects. The inventory station 800 can also include a temporary storage location 802. The temporary storage location 802 can be used to store inventory (e.g., an inventory item 40(1)) for a short period of time. The temporary storage location 802 can include a storage frame 804 configured to retain one or more inventory containers 806(1)-806(N). The storage frame 804 can also be configured to couple with the mobile drive unit 20.

The user 104 can utilize the user devices 702(1), 702(2) to perform techniques relating to interacting with inventory (e.g., stowing and removing items) at the inventory station 800. For example, information can be presented on a display of the user device 702(2) that instructs the user 104 to retrieve the inventory item 40(2) from the temporary storage location 802 and stow the inventory item 40(2) in the inventory holder 30. The user 104 may use the user device 702(1) to record his interactions with the inventory item 40(2). For example, interactions can include scanning the inventory item 40(2) and scanning the particular compartment of the inventory holder 30 in which the inventory item 40(2) was placed. In some examples, the user device 702(2) performs at least some of the operations described herein with reference to the projection management engine 710. In some examples, the projection management system 112 manages the operation of the user devices 702 and other user devices throughout the inventory system 10. At the same time, the user device 702(2) may manage the operation of the local devices at the inventory station 800.

The inventory station 800 can also include the image projection device 106, one or more image capture devices 808, and a sensor package 812 including one or more sensors. As introduced herein, the image projection device 106 may include any suitable device (e.g., image projector, video projector, etc.) capable of projecting information on a background. Such information can include video projections (e.g., a series of moving images) and still image projections. Each of these may be rendered by the image projection device 106 and projected on the background. The video projections and the image projections may be provided to the image projection device 106 in any suitable format. Examples of still image projections can include webpages, documents, and any other information that can be rendered on a typical display. The image projection device 106 can include a Liquid Crystal Display (LCD) projector, a Light-emitting Diode (LED) projector, a Digital Light Processing (DLP) projector, or any other suitable type of projector. In some examples, the image projection device 106 may produce light at 50 to 5,000 lumens. In some examples, the image projection device 106 may produce light at lesser lumens or greater lumens.

The image projection device 106 can be configured to project the information (e.g., video, images, and the like) in the direction of the inventory holder 30. In this example, the inventory holder 30 may function as a background on which the information can be projected. In some examples, the information projected on the inventory holder 30 may relate to the actions of the user 104 with respect to the inventory holder 30. Continuing with the example from above relating to stowing the inventory item 40(2), the image projection device 106 can project a user interface image that includes a particular component that highlights the particular compartment of the inventory holder 30 in which the inventory item 40(2) is to be placed. This may confirm to the user 104 that the inventory item 40(2) was indeed left in the particular highlighted compartment. In some examples, the user interface image may highlight a particular compartment as part of removing inventory items 40 from the inventory holder 30. For example, the highlighted particular compartment (e.g., the compartment with light projected on it) may include an inventory item that needs to be removed from the inventory holder 30 and placed in the temporary storage location 802. The fact that the particular compartment is highlighted may function to direct the user's 104 attention to the particular compartment. In some examples, other information is provided to the user 104 to inform his decision to remove the inventory item from the particular compartment. For example, information may be presented on one or more of the user devices 702 that uniquely identifies the inventory item. In this manner, the user interface image may identify which compartment (e.g., the particular compartment) and the other information may identify the particular inventory item within the particular compartment.

The image capture device 808 may be any suitable device configured to capture one or more images. In some examples, the image capture device 808 may capture images of the background (e.g., the inventory holder 30) while the image projection device 106 projects information. For example, the image capture device 808(1), which may be orientated similarly as the image projection device 106, may capture images of the user 104, the inventory holder 30, and other objects located between the image capture device 808(1) and the inventory holder 30 (e.g., the inventory item 40(2)). The images captured by the image capture device 808(1) may be used to determine information about the objects depicted in the images. In some examples, the image projection device 106 and the image capture device 808(1) may be included in a single device, capture/project information from the same frame of reference, and/or otherwise by synched together. This may enable using the image capture device 808(1) to calibrate the image projection device 106 and to implement techniques described herein by capturing images at certain frequencies based on what the image projection device 106 is projecting at those frequencies.

In some examples, the image capture device 808(2), which may be orientated opposite the image projection device 106, may capture images of the user 104, objects with which the user 104 interacts (e.g., the inventory item 40(2)), and any other suitable objects within the range of image capture device 808(2). In some examples, the images captured by the image capture device 808(2) may be used to determine information about the objects, including the user 104, depicted in the images. For example, the images may be used to determine that the user 104 is preparing to turn towards the image projection device 106. In this case, the image projection device 106 should be turned off, or the image being projected should be modified.

The sensor package 812 may include any suitable sensor or set of sensors configured to detect sensor information as described herein. For example, the sensors of the sensor package 812 can include one or more radio-frequency (RF) readers configured to communicate with RF antennas mounted on a wearable device 814 (e.g., illustrated as a set of safety glasses) worn by the user 104.

The sensors of the sensor package 812 can also include one or more motion capture sensors configured to detect visually-identifiable markers associated with the user 104. For example, the visually-identifiable markers may be the eyes of the user 104, fiducial markings on the wearable device 814, or any other suitable markings.

The sensors of the sensor package 812 can also include a light projection device configured to project light away from the sensor package 812. The projected light may come into contact with one or more photoresistors or other sensors attached to objects (e.g., the user 104 and/or the wearable device 814) that can detect the projected light. Information about the projected light and information about the light detected by the photoresistors can be used to determine at least position and orientation of the objects.

The sensors of the sensor package 812 can also include a depth sensor configured to detect depths of objects within its field of view. The depth sensor can be used to determine whether the user 104 is in front of the inventory holder 30 and other information about obstructions. In some examples, the depth sensor and/or other sensors described herein with reference to the sensor package 812 are included in the image capture devices 808. For example, the image capture device 808(2) can include a ranging camera, a flash lidar camera, a time-of-flight (ToF) camera, and/or RGB-Depth camera.

The sensors of the sensor package 812 can also include a position detection device configured to detect a position of objects with respect to itself. For example, the position detection sensor may be configured to generate a light plane that is about parallel to a face of the inventory holder 30 to detect positions where objects intersect (e.g., pass through) the light plane (e.g., a hand of the user 104 holding the inventory item 40(2)). In some examples, the position detection device may also detect other information about the objects that intersect the light plane. Such other information may indicate dimensional characteristics of the objects. In some examples, the position detection device may be a Light Detection and Ranging (LIDAR) device or other suitable laser scanner or 3-Dimensional scanner.

In some examples, the sensor package 812 and/or the image capture device 808(2) may be mounted or otherwise attached to a frame 816. The frame 816 may be dimensioned to receive the inventory holder 30 and to enable the user 104 to interact with the inventory holder 30 via the frame 816. In some examples, the sensor package 812 and/or the image capture device 808(2) may be mounted to a different structure other than the frame 816.

Figure 9:
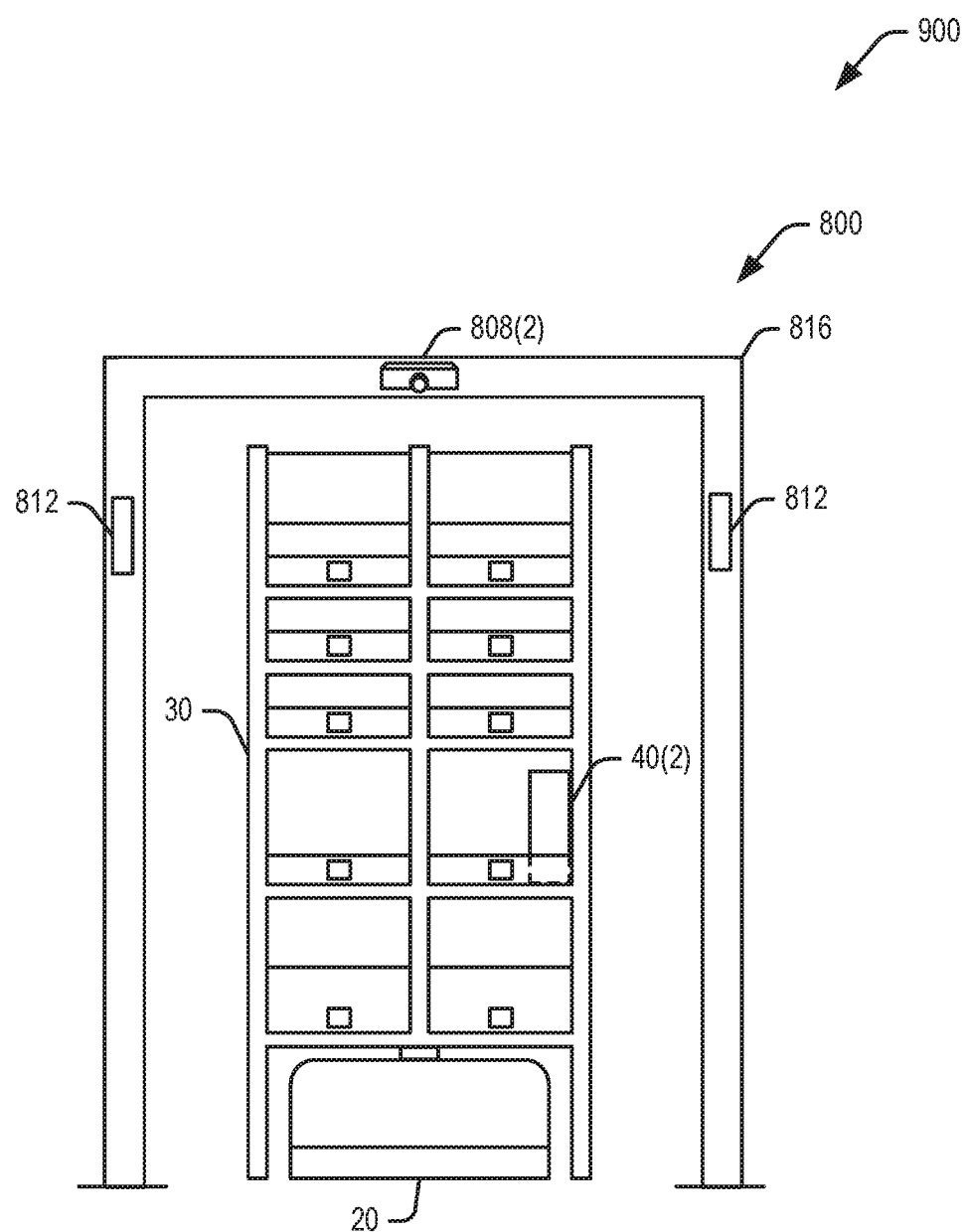
FIG. 9 illustrates a view of the inventory station shown in FIG. 8, according to at least one example.

FIG. 9 illustrates a frontal view 900 of the inventory station 800, according to at least one example. The view 900 may be from the perspective of the image capture device 808(1) and/or the image projection device 106. In some examples, the view 900 may be represented after the user 104 has placed the inventory item 40(2) in the inventory holder 30. The view 900 will be used a frame of reference for later figures.

Figure 10:
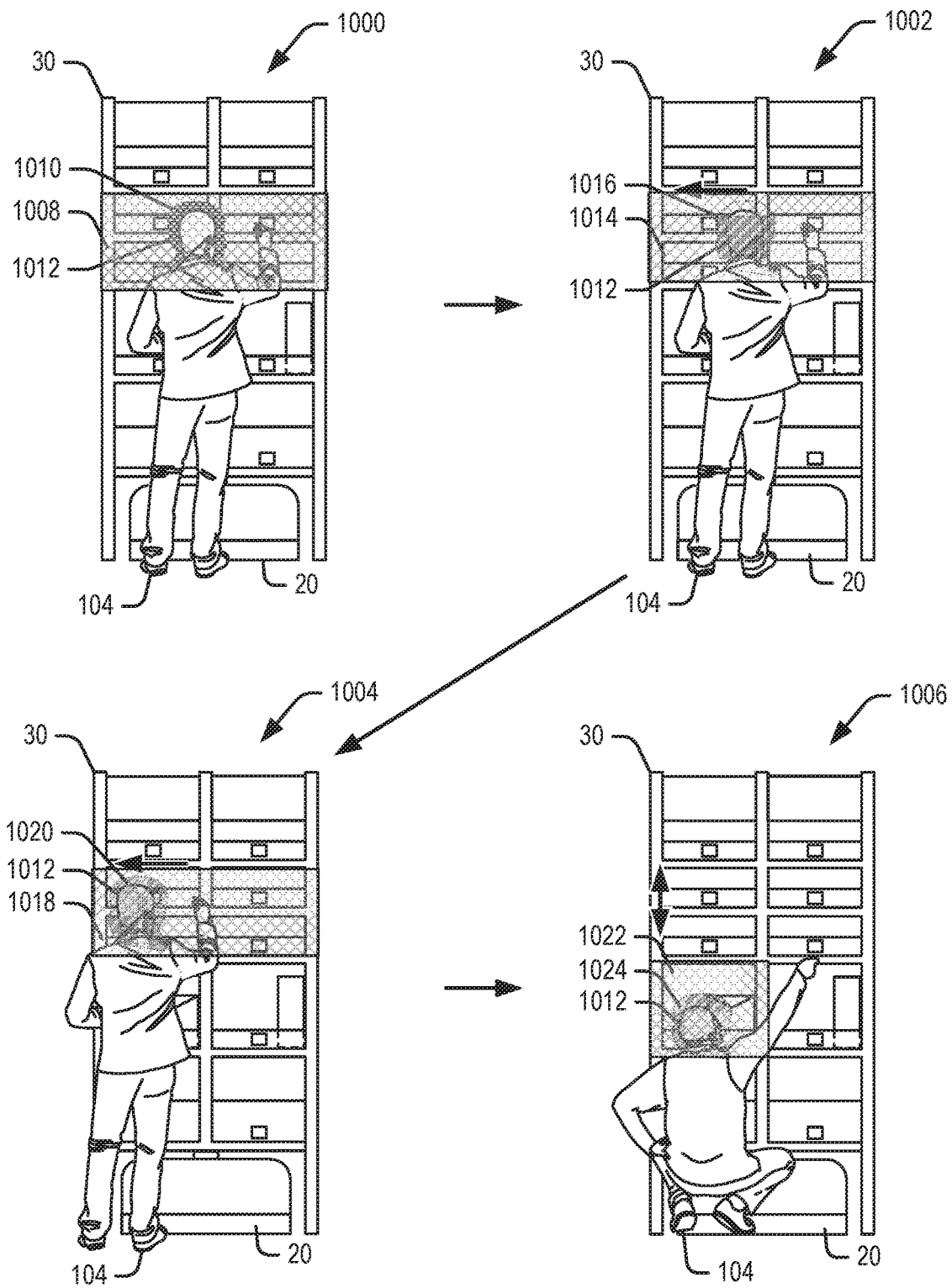
FIG. 10 illustrates views of a user interacting with a background as it relates to implementing techniques relating to modifying projected images based on obstructions as described herein, according to at least one example.

FIG. 10 illustrates views 1000-1006 of the user 104 interacting with the inventory holder 30 as it relates to implementing techniques relating to modifying projected images based on obstructions, according to at least one example. In some examples, any other suitable surface on which information may be projected may be substituted in place of or in addition to the inventory holder 30. The inventory holder 30 may be detachably coupled to the mobile drive unit 20. The views 1000-1006 may include the user 104 interacting with the inventory holder 30. In the views 1000-1006, it may be considered that the user 104 is facing the inventory holder 30 with his back to the image projection device 106.

The view 1000 may include a first projected image 1008 that is projected on to the inventory holder 30. In some examples, the first projected image 1008 may be used to emphasize one or more compartments of the inventory holder 30. A shadow 1010 may be cast on the inventory holder 30 by virtue of the user 104 standing in between the inventory holder 30 and the image projection device 106. While the shadow 1010 is only illustrated as corresponding to a head 1012 of the user 104, it is understood that other shadows (or part of the same shadow) may also be cast that correspond to other parts of the user 104 (e.g., shoulders, arm, and hand of the user 104). Thus, the shadow 1010 may correspond in size and shape to the head 1012 of the user 104. In some examples, the head 1012 of the user 104 may be considered an obstruction that blocks at least a portion of the first projected image 1008.

In some examples, an image may be captured by the image capture device 808(1) that depicts a portion of the view 1000. For example, the image may depict the first projected image 1008, the head 1012, and the shadow 1010. The image may be used by the projection management system 112 to determine how to modify the first projected image 1008. For example, the image may be processed to detect the edges of the head 1012 and/or the edges of the shadow 1010 as depicted in the image. The first projected image 1008 may then be modified based on the detected edges or a new projected image may be generated based on the detected edges. In some examples, the shadow 1010 and/or the head 1012 are detected using background subtraction techniques by which the first projected image 1008 is compared to the image captured by the image capture device 808(1).

In some examples, the image capture device 808(1) may include a depth sensor configured to detect position and orientation of the head 1012 in three-dimensional space with respect to the inventory holder 30, the image capture device 808(1), and/or any other object within the field of view of the depth sensor. Depth information about the position and/or orientation may be provided to the projection management system 112 to determine how to modify the first projected image 1008 to account for the position and orientation of the head 1012.

In some examples, certain other sensor information may be received that identifies aspects of the position and/or orientation of the head 1012 and/or the user 104 with respect to the inventory holder 30 and/or with respect to the sensors that collect the sensor information. Such sensor information can also be used to determine how to modify the first projected image 1008 to account for the position and/or orientation of the head 1012. For example, sensor information collected from sensors on the hands of the user 104 may be used to determine that the user 104 is moving away from or towards the inventory holder 30.

In some examples, the other sensor information includes at least one of motion sensor information indicating movements of the head 1012 with respect to a motion sensing device, depth sensor information indicating a position of the head 1012 with respect to a depth sensing device, radio-frequency information indicating an orientation of the head 1012 with respect to the inventory holder 30, or light sensor information indicating an orientation and a position of the head 1012 with respect to a light sensing device.

The view 1002 may include a second projected image 1014 that may be a modified version of the first projected image 1008 or an entirely new projected image. In either case, the second projected image 1014 may include a modified region 1016 that corresponds to the head 1012 (e.g., the obstruction) and/or the shadow 1010. The modified region 1016 may include an area that is less bright than the remainder of the second projected image 1014 (e.g., a dimmed region), an area that is black-out or otherwise lacks light (e.g., a blacked-out region), an area that is a different color than the other parts of the second projected image 1014, and any other area having any other suitable distinction. In some examples, images (e.g., the projected images 1014, 1016 and other projected images described herein) may be defined in terms of a color cylindrical coordinate representation of a RGB color model such as hue, saturation, brightness (HSB). In some examples, modifying an image (e.g., generating the modified region 1016) may include modifying values in the HSB representation or other image characteristics of the image. For example, the brightness value, which may correspond to brightness or lightness of the image (or portion of the image), may be adjusted to decrease the brightness of the projected image and/or a portion of the projected image (e.g., the modified region 1016). In some examples, hue and/or saturation values may also be adjusted to change aspects of the projected image. Other characteristics of the images may also be adjusted.

In between the view 1002 and the view 1004, the user 104 has moved to the left with respect to the inventory holder 30. This movement may be captured in an image by the image capture device 808(1) or otherwise detected using sensor information. Using similar techniques as described above, a third projected image 1018 may be generated based on the position and/or orientation of the head 1012 in the view 1004. The third projected image 1018 may be a modified version of the second projected image 1014 or an entirely new projected image. In either case, the third projected image 1018 may include a modified region 1020 that corresponds to the head 1012 and/or the shadow 1010. The modified region 1020 may include any suitable modification as described herein (e.g., a modification that is similar to the modified region 1016).

In between the view 1004 and the view 1006, a fourth projected image 1022 has been projected on the inventory holder 30. The fourth projected image 1022 may have been generated initially without respect to the head 1012 being an obstruction. For example, the fourth projected image 1022 may have been generated to highlight the compartment that is within the fourth projected image 1022. Additionally, in between the view 1004 and the view 1006, the user 104 has crouched down with respect to the inventory holder 30. This may have been in response to the fourth projected image 1022 being projected on the inventory holder 30. In any event, this movement of the user 104 (or at least the new position of the user 104) may be captured in an image by the image capture device 808(1) or otherwise detected using sensor information. Using similar techniques as described above, the fourth projected image 1022 may be modified to include a modified region 1024. In some examples, the fourth projected image 1022 that includes the modified region 1024 may be an entirely new image. The modified region may include any suitable modification as described herein (e.g., a modification that is similar to the modified region 1016).

Figure 11:
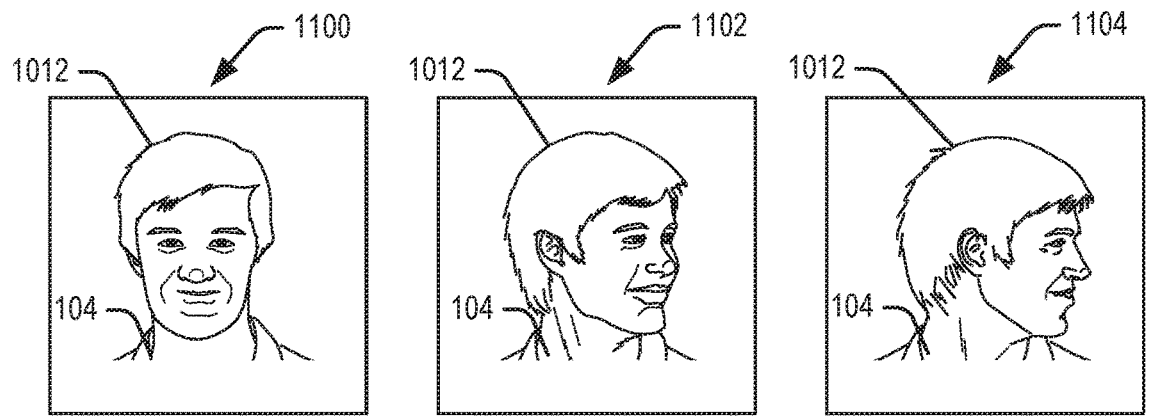
FIG. 11 illustrates views of a user as it relates to implementing techniques relating to modifying projected images based on obstructions as described herein, according to at least one example.

FIG. 11 illustrates views 1100-1104 of the head 1012 of the user 104 as it relates to implementing techniques relating to modifying projected images based on obstructions, according to at least one example. The movements of the head 1012 in the views 1100-1104 may be representative of an example in which an orientation and/or position of an object (e.g., the head 1012) is tracked in order to determine what changes to make to a projected image. For example, in some cases, it may not be bothersome to the user 104 to have an image constantly projected on his backside (e.g., as shown in the views 1000-1006). However, modifications to the projected image may be beneficial when the user 104 turns and faces the image projection device 106. Thus, the views 1100-1104 represent information about the head 1012 that can be collected in order to determine when to modify the projected image based on an orientation of the head 1012.

In some examples, the movements depicted in the views 1100-1104 (e.g., the user 104 rotating his head 1012) may be detected using camera information and/or sensor information. For example, the views 1100-1104 may be examples of one or more images captured by the image capture device 808(2) as the user 104 interacts with the inventory holder 30. The image capture device 808(2) may be orientated to capture images of a front-side of the user 104 when the user 104 faces the inventory holder 30 or other suitable background. Thus, in the view 1100, it may be considered that the user 104 is facing the inventory holder 30 with his back to the image projection device 106. In the view 1102, it may be considered that the user 104 is beginning to rotate towards the image projection device 106 (e.g., away from the inventory holder 30). In the view 1104, it may be considered that the user 104 has turned even more towards the image projection device 106.

The images corresponding to the views 1100-1104 may be processed using any suitable technique to determine that the user 104 is preparing to rotate his head 1012. This may be achieved by identifying two or more identifiable markers (e.g., the eyes of the user 104 or markers attached to a hat, a pair of glasses, or other wearable device) and tracking the movements of the identifiable markers. For example, in the view 1100 (e.g., a first image) the user 104 is facing forward and both eyes are clearly visible. However, in the view 1102 (e.g., a second image), which may correspond to a time later than the view 1100, a first eye is visible and a second eye is partially occluded. Finally, in the view 1104 (e.g., a third image), which may correspond to a time later than the view 1102, the first eye is visible and the second eye is completely occluded. A Kalman filter or other technique may be used to determine next likely positions for the identifiable markers (e.g., the eyes), and when this processing is suggestive of the user 104 turning his head 1012, the projection management system 112 may make one or more adjustments to the projected image, as described herein with reference to FIG. 12.

As introduced above, the movements depicted in the views 1100-1104 (e.g., the user 104 rotating his head 1012) may be detected using sensor information. For example, sensors attached to a wearable device worn by the user 104 may detect when the user 104 is turning his head 1012. In some examples, other sensors may be configured to collect other sensor information such as motion sensor information indicating movements of the head 1012 with respect to a motion sensing device, depth sensor information indicating a position of the head 1012 with respect to a depth sensing device, radio-frequency information indicating an orientation of the head 1012 with respect to the inventory holder 30, or light sensor information indicating an orientation and a position of the head 1012 with respect to a light sensing device.

Figure 12:
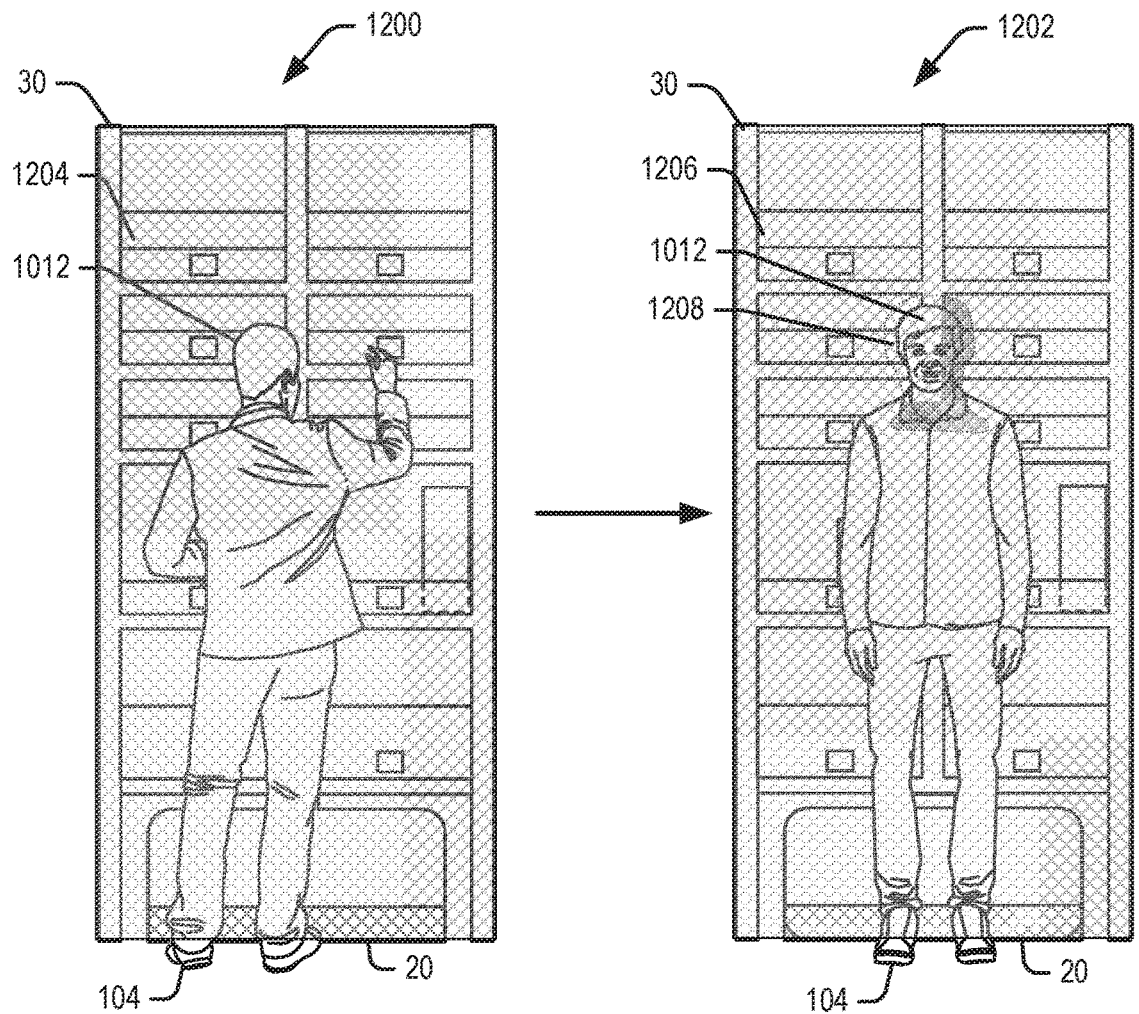
FIG. 12 illustrates views of a user interacting with a background as it relates to implementing techniques relating to modifying projected images based on obstructions as described herein, according to at least one example.

FIG. 12 illustrates views 1200-1202 of the user 104 as the user 104 interacts with the inventory holder 30 as it relates to implementing techniques relating to modifying projected images based on obstructions, according to at least one example. The view 1200 may correspond to the view 1100. For example, in the view 1100 the user 104 may be facing the inventory holder 30 and the image capture device 808(2), which may be orientated opposite the image projection device 106. Similarly, in the view 1200, the user 104 may be facing the inventory holder 30, with the image projection device 106 projecting a first projected image 1204 at the backside of the user 104. In this example, the first projected image 1204 covers the entire face of the inventory holder 30.

The view 1202 may correspond to a view corresponding to a time after the view 1104. For example, in the view 1104 the user 104 has rotated his head 1012 half-way around. In the view 1202, the head 1012 and the user 104 may be rotated completely 180 degrees from the views 1200 and 1100. Thus, in the view 1202 the user 104 may be facing the image projection device 106 and a second projected image 1206 may be projected on the inventory holder 30. Between the view 1200 and the view 1202, the first projected image 1204 may be modified to create the second projected image 1206 or the second projected image 1206 may be an entirely new image. In any event, the second projected image 1206 may include a modified region 1208 that corresponds to the head 1012 of the user 104. In this manner, the light from the image projection device 106 may be modified in the modified region in order to minimize the light that shines in the face of the user 104. In some examples, the modified region 1208 is generated prior to or in expectation of the user 104 rotating his head 1012.

Figure 13:
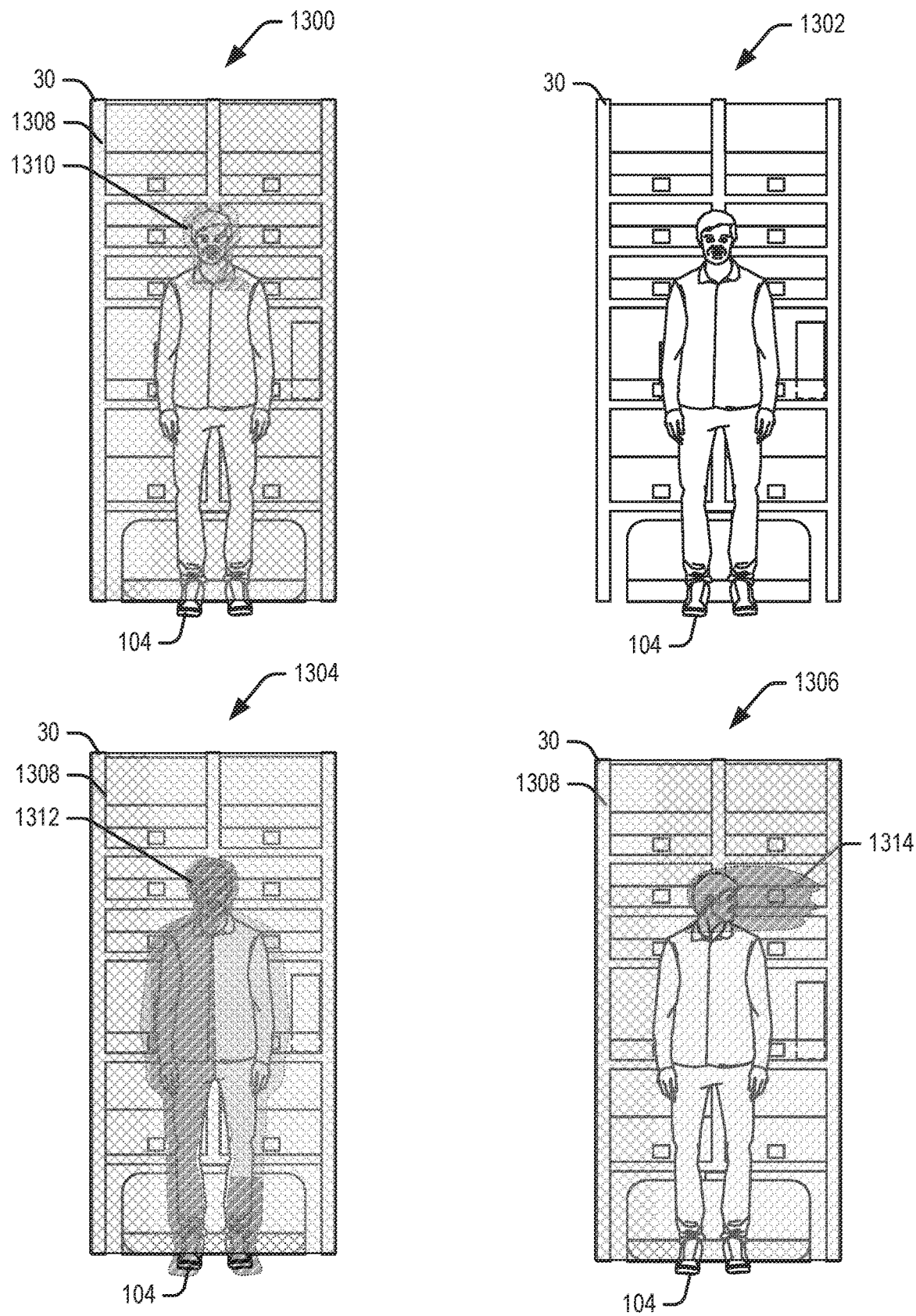
FIG. 13 illustrates views of a user interacting with a background as it relates to implementing techniques relating to modifying projected images based on obstructions as described herein, according to at least one example.

FIG. 13 illustrates views 1300-1306 of the user 104 in front of the inventory holder 30 as it relates to implementing techniques relating to modifying projected images based on obstructions, according to at least one example. In particular, the views 1300-1306 may illustrate various modifications that can be made to respond to detection of an obstruction in accordance with techniques described herein.

The view 1300 may include a projected image 1308 that includes a modified region 1310. The modified region 1310 may correspond in size and shape to its associated obstruction (e.g., the head 1012). In some examples, the modified region 1310 is a blacked-out region, a dimmed region, a different-colored region, a powered-off region, and the like. In most cases, the modified region 1310 is a modification to the underlying image that is projected on the inventory holder 30. In some examples, like in the powered-off region, the image projection device 106 may power off and/or occlude certain portions of its lighting element(s) in order to create the modified region. In some examples, this may include adding a light-blocking filter to a portion of the lens of the image projection device 106. In some examples, the modified region 1310 may correspond to a standard shape and/or size based on the size and shape of the detected obstruction. For example, the modified region 1310 may be an oval or circle that corresponds to the head 1012.

The view 1302 may not include a projected image on the inventory holder 30. This may be because the image projection device 106 was instructed to power off, pause projecting, or actuate a cover to eliminate projection of any image. The instruction may have been based on detection of the user 104 being located in front of the inventory holder 30 and/or facing the image projection device 106 as described herein.

The view 1304 may include the projected image 1308 that includes a modified region 1312. The modified region 1312 may correspond in size and shape to its associated obstruction (e.g., the user 104). In this example, the modified region 1312 may correspond to an outline of the user 104. The modified region 1312 may correspond to an outline of any other suitable object that may obstruct the projected image 1308.

The view of 1306 may include the projected image 1308 that includes a modified region 1314. The modified region 1314 may be sized to accommodate expected movements of the obstruction (e.g., the user 104). For example, the systems described herein may be configured to detect that the user 104 is going to move to the right. This may be based on the user 104 rotating his head 1012 and/or by using any other suitable information.

Figure 14:
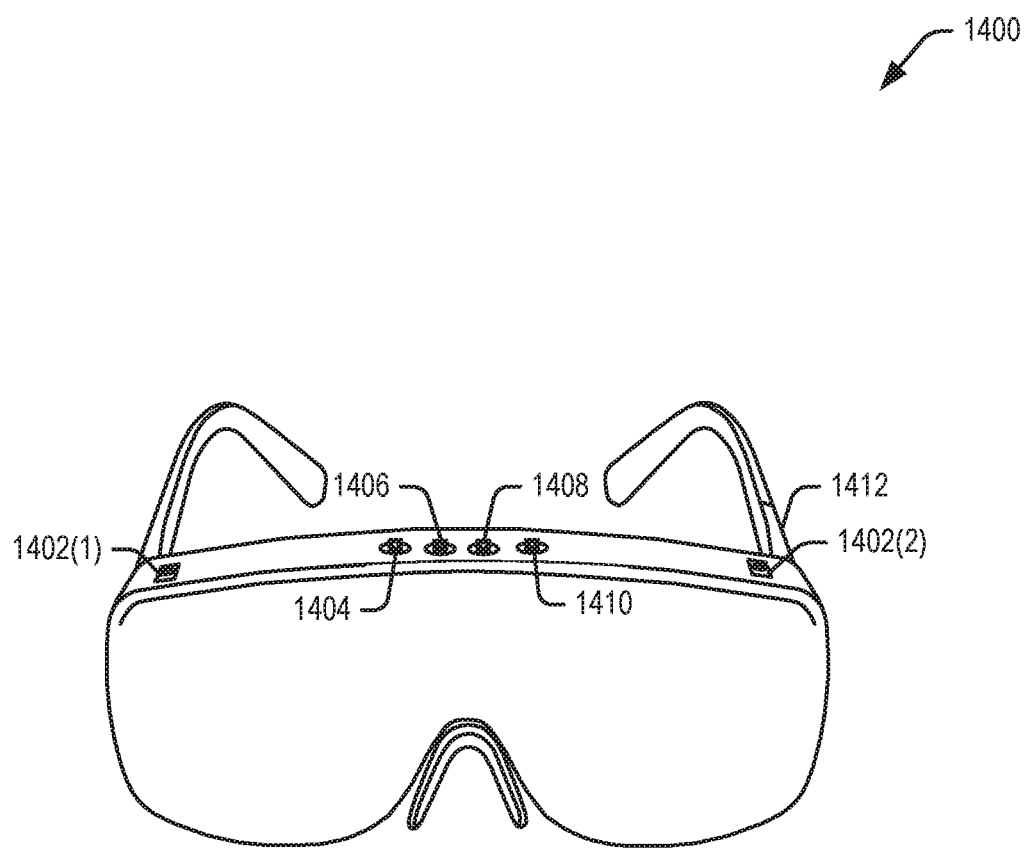
FIG. 14 illustrates an example wearable device for implementing techniques relating to modifying projected images based on obstructions as described herein, according to at least one example.

FIG. 14 illustrates an example wearable device 1400 for implementing techniques relating to modifying projected images based on obstructions, according to at least one example. The wearable device 1400 is an example of the wearable device 814 introduced herein. Thus, the wearable device 1400 is illustrated as a set of glasses that can be worn by the user 104. The glasses may be safety glasses issued to the user 104 as part of interacting with the inventory holder 30. In some examples, the wearable device 1400 may include a hat such as a hardhat or sport hat. In some examples, the functionality described with reference to the device 1400 may be included in a portable device such as a microphone, cell phone, presentation clicker, and the like. In this manner, the portable device may be used to gather information that can be used to modify a projected image. For example, the user 104 may hold the microphone as part of delivering a presentation. In this example, the user 104 may face the image projection device 106. The projected image (e.g., the presentation) may be modified to account for the user 104 acting as an obstruction between the image projection device 106 and a background (e.g., a presentation screen). For example, a modified region of the projected image may correspond to the head of the user 104 and may have a reduced brightness such that the user 104 is not blinded by the projected image.

The wearable device 1400 may include one or more RF antennas 1402(1), 1402(2), a depth sensor 1404, an image capture device 1406, a light sensor 1408, and a position sensor 1410. The operation of the antennas 1402, the depth sensor 1404, the image capture device 1406, the light sensor 1408, and the position sensor 1410 may be managed, at least in part, by a management device 1412. The management device 1412 may include any suitable combination of integrated circuits, network interfaces, processors, memory, user interfaces, power source, and the like to enable the wearable device 1400 to receive and share information with the projection management system 112 and manage the RF antennas 1402 and sensors 1404-1410. In some examples, use of the wearable device 1400 may enable implementation of the techniques described herein without the image capture devices 808(1), 808(2) and/or the sensor package 812. This may be because the wearable device 1400 includes at least some functionality exhibited by the image capture devices 808(1), 808(2) and/or the sensor package 812. In some examples, the wearable device 1400 is used in connection with the image capture devices 808(1), 808(2) and/or the sensor package 812.

The RF antennas 1402 may be configured to detect RF energy that is transmitted in the direction of the RF antennas 1402. For example, one or more RF readers can be configured to transmit RF energy away from a background. The RF antennas 1402, when orientated towards the RF readers, may detect the transmitted RF energy. Because the RF antennas 1402 are disposed on the front side of the wearable device 1400, when both RF antennas 1402 detect RF energy, it may be inferred that the wearable device 1400 (and thus the user 104 wearing the wearable device 1400) is facing the background (e.g., the inventory holder 30). When the user 104 wearing the wearable device 1400 rotates toward the projection device 106 (e.g., to have her back facing the RF readers), her body and/or head may act as a RF energy shield such that the RF antennas 1402 cannot detect the RF energy being transmitted from the RF readers. In some examples, the user's body and/or head may only shield a portion of the RF energy from the RF readers. In this manner, the RF antennas 1402 may detect a weaker signal of the RF energy when the user 104 faces the image projection device 106 as compared to other orientations (e.g., the user 104 facing the RF readers, the user 104 partially facing the RF readers, etc.). Thus, when only one RF antenna 1402 detects RF energy or the two RF antennas 1402 detect RF energy of different strengths, it may be inferred that the wearable device 1400 (and thus the user 104) is no longer directly facing the background. Depending on the timing of when communication with the one RF antenna 1402 ceased or the signals of different strengths were detected, it may be determined that the user 104 is rotating away from the background and toward the image projection device 106. When neither of the RF antennas 1402 detect RF energy or both detect weakened signals (e.g., as compared to some threshold strength), it may be inferred that the wearable device 1400 is no longer facing the background (and thus the user 104 has rotated 180 degrees). In some examples, the RF antennas 1402 may be configured to primarily detect RF energy within a particular range (e.g., extending in a forward direction away from the wearable device 1400). In this manner, determining an orientation of the user 104 may be further based at least in part on the particular range. At any point along the way, the techniques described herein can be used to modify a projected image and/or power off the image projection device 106 based on information from the RF readers and/or the RF antennas 1402.

The depth sensor 1404 may be configured to detect distances and/or positions of objects with respect to the wearable device 1400 without interacting with other devices. This information may be used to determine an orientation of the wearable device 1400 (and thus the user 104) with respect to the image projection device 106, a background, and any other object within the field of view of the depth sensor 1404. In some examples, information collected by the depth sensor 1404 may be used to determine whether to modify a projected image, power off the image projection device 106, and/or perform any other action as described herein.

The image capture device 1406 may be configured to capture images. For example, the image capture device 1406 may be an example of the image capture device 808. Because the image capture device 1406 is located on the front side of the wearable device 1400, images captured by the image capture device 1406 may be representative of what the user 104 is viewing. For example, when the images depict the inventory holder 30 or other background, it may be determined that the wearable device 1400 (and thus the user 104) is orientated towards the inventory holder 30 or other background. When the user 104 rotates towards the image capture device 1406 (or otherwise moves around), the objects depicted in the images will change. These images (e.g., a sequence of images) may be used to determine whether to modify a projected image, power off the image projection device 106, and/or perform any other action as described herein.

The light sensor 1408 may be configured to detect light that is projected toward the light sensor 1408. In some examples, the light may be projected by a light projection device (e.g., attached to the inventory holder 30 or other object at the inventory station 800) configured to project pulses of light according to a fixed interval. The response times associated with when the pulses of light are detected by the light sensor 1408 may be used to determine position information about the wearable device 1400. In some examples, the light sensor 1408 may include a photoresistor. This information collected by the light sensor 1408 may be used to determine whether to modify a projected image, power off the image projection device 106, and/or perform any other action as described herein.

The position sensor 1410 may be configured to detect its position (e.g., within the inventory station 800) without interacting with other devices. The position sensor 1410 may include any suitable combination of devices such as accelerometers, gyrometers, inclinometers, and other suitable devices used to detect position and/or orientation of an object. In some examples, position information provided by the position sensor 1410 may be used to determine how to modify a projected image, power off the image projection device 106, and/or perform any other action described herein. For example, the position information may indicate a position and/or orientation of the wearable device 1400 within a three-dimensional space, and this position information may be used to determine placement, size, and shape of a modified region in the projected image.

Figure 15:
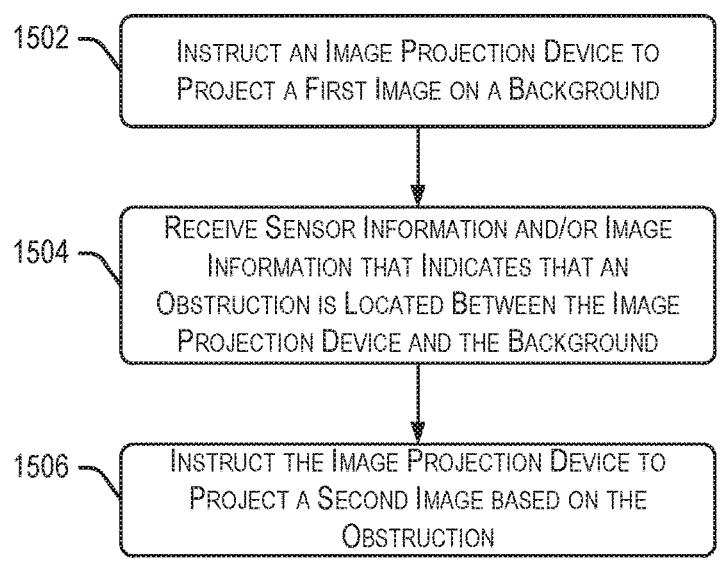
FIG. 15 illustrates a flow chart including example acts or techniques relating to modifying projected images based on obstructions, according to at least one example.
Figure 16:
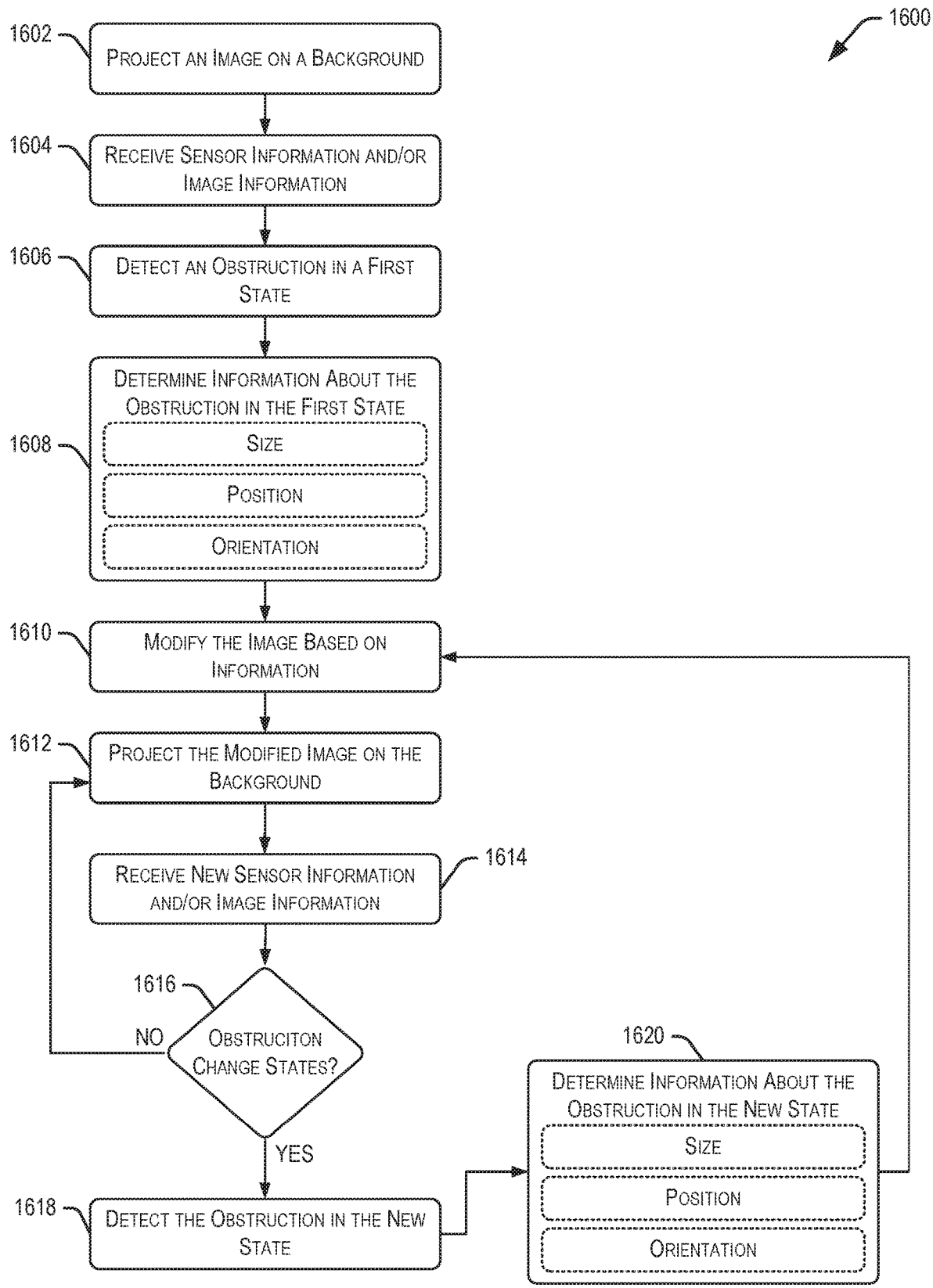
FIG. 16 illustrates a flow chart including example acts or techniques relating to modifying projected images based on obstructions, according to at least one example.

FIGS. 15 and 16 illustrate example flow diagrams showing respective processes 1500 and 1600 as described herein. These processes 1500 and 1600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 15 depicts the process 1500 including example acts or techniques relating to modifying projected images based on obstructions, in accordance with at least one example. The projection management engine 710, whether embodied in the projection management system 112 or the user device 702, may perform the process 1500 of FIG. 15.

The process 1500 may begin at 1502 by instructing an image projection device to project a first image on a background. The first image may include a webpage. The first image may be a user interface image that includes one or more user interface components that are independently changeable. For example, a first user interface component may be a first color in order to highlight a first portion of the background. The remaining user interface components may be a second color. In some examples, the user interface components can be made to flash, change color, etc. by changing the first image at the image projection device. The background may be any suitable surface including, for example, an inventory holder or other structure in which inventory items are held.

At 1504, the process 1500 includes receiving sensor information and/or image information that indicates that an obstruction is located between the image projection device and the background. The obstruction may correspond to any object located between the image projection device and the background. In some examples, the obstruction can include a human user or part of the human user (e.g., a head). The human user may be disposed between the background and the image projection device as part of delivering a presentation, interacting with the background (e.g., the inventory holder 30), and for any other suitable purpose. The obstruction may include a single obstruction or multiple obstructions. For example, more than one user may deliver the presentation or interact with the background. In this example, the sensor information and/or image information may detect the more than one user. The sensor information and/or image information may be received from one or more sensors and/or one or more image capture devices included in a wearable device and/or disposed adjacent to the image projection device and/or the background.

At 1506, the process 1500 instructs the image projection device to project a second image based on the obstruction. In some examples, this may include generating the second image based at least in part on aspects of the obstruction (e.g., orientation, position, size, and shape). The second image may include a modified region that corresponds to the obstruction. In some examples, the modified region includes a modification of the entire first image.

FIG. 16 depicts the process 1600 including example acts or techniques relating to modifying projected images based on obstructions, in accordance with at least one example. The projection management engine 710, whether embodied in the projection management system 112 or the user device 702, may perform the process 1600 of FIG. 16.

The process 1600 may begin at 1602 by projecting an image on a background. An image projection device may be used to project the image on the background. The projection management system may be configured to instruct the image projection device to project the image on the background.

At 1604, the process 1600 includes receiving sensor information and/or image information. The sensor information and/or image information may be received from one or more sensors and/or one or more image capture devices included in a wearable device and/or disposed adjacent to the image projection device and/or the background.

At 1606, the process 1600 includes detecting an obstruction in a first state. The obstruction may correspond to any suitable object disposed between the image projection device and the background. The obstruction may obstruct at least a portion of the image from being completely projected on the background.

At 1608, the process 1600 includes determining information about the obstruction in the first state. This can include using the sensor information and/or image information. The information about the obstruction can include size information, position information, and/or orientation information. The size information may indicate a size of the obstruction in the first state. The position information may indicate a position of the obstruction with respect to some reference point (e.g., a sensor, the image projection device, the background, etc.). The orientation information may indicate an orientation of the obstruction with respect to some reference point (e.g., a sensor, the image projection device, the background, markers, etc.). For example, the obstruction may include two or more identifiable markers. The identifiable markers may be detected and tracked to determine the orientation information.

At 1610, the process 1600 includes modifying the image based on the information. This can include adding a modified region to the image that corresponds to the obstruction. The size and shape of the modified region may be determined based at least in part on the information about the obstruction in the first state. In some examples, the size and shape of the modified region are predetermined, and selection of the modified region includes selecting the predetermined modified region based on the information.

At 1612, the process 1600 includes projecting the modified image on the background. At 1614, the process 1600 includes receiving new sensor information and/or image information. The new sensor information and/or image information may be collected after the modified image was projected at 1612.

At 1616, the process 1600 includes determining whether the obstruction has changed states. This can include using the new sensor information and/or image information to determine whether the obstruction has moved, changed size, rotated, etc. relative to its first state. If the answer at 1616 is NO, the process 1600 may return to 1612 where the modified image may continue to be projected on the background. If the answer at 1616 is YES, the process 1600 may continue to 1618. At 1618, the process 1600 includes detecting the obstruction in the new state. This can include using the new sensor information and/or image information to detect that the obstruction is in a different state than the first state.

At 1620, the process 1600 includes determining information about the obstruction in the new state. This can include using the new sensor information and/or image information. The information about the obstruction in the new state can include size information, position information, and/or orientation information. The size information may indicate a size of the obstruction in the new state. The position information may indicate a position of the obstruction with respect to some reference point (e.g., a sensor, the image projection device, the background, etc.). The orientation information may indicate an orientation of the obstruction with respect to some reference point (e.g., a sensor, the image projection device, the background, markers, etc.). For example, the obstruction may include two or more identifiable markers. The identifiable markers may be detected and tracked to determine the orientation information. After 1620, the process 1600 returns to 1610 where the image is modified based on the information.

Figure 17:
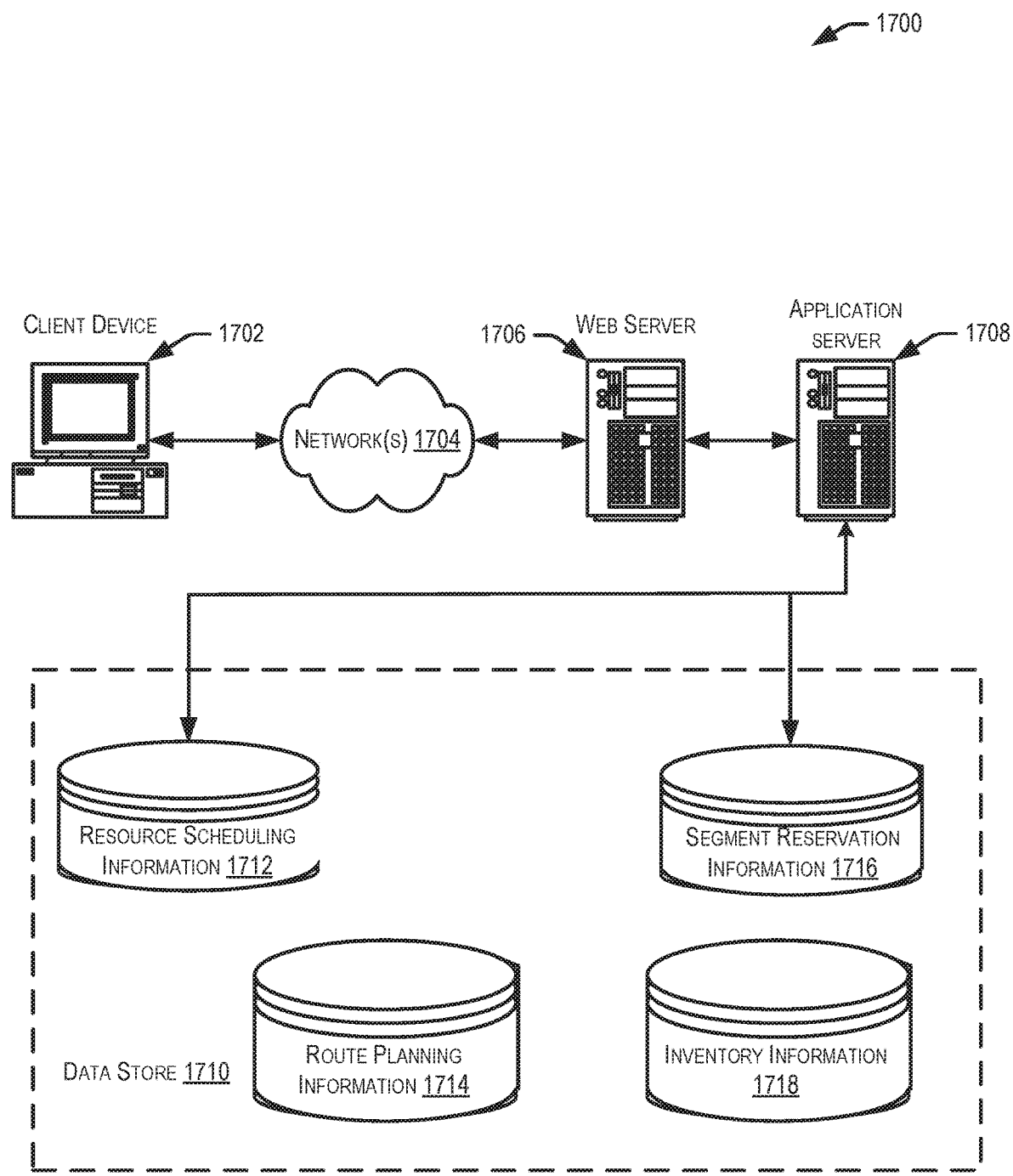
FIG. 17 illustrates an environment in which various examples can be implemented.

FIG. 17 illustrates aspects of an example environment 1700 for implementing aspects in accordance with various embodiments. As will be appreciated, although a Web-based environment is used for purposes of explanation, different environments may be used, as appropriate, to implement various embodiments. The environment includes an electronic client device 1702, which can include any appropriate device operable to send and receive requests, messages, or information over an appropriate network 1704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1702 and the application server 1708, can be handled by the Web server. It should be understood that the Web and application servers are not required and are merely example components, as structured code discussed herein can be executed on any appropriate device or host machine as discussed elsewhere herein.

The data store 1710 can include several separate data tables, databases or other data storage mechanisms and media for storing data relating to a particular aspect. For example, the data store illustrated includes mechanisms for storing information which can be used by modules described herein, such as resource scheduling information 1712, route planning information 1714, segment reservation information 1716, and/or inventory information 1718. The inventory information 1718 can include information about inventory processed in the inventory system 10. This can include unique item identifiers, item descriptors, storage locations, and the like. It should be understood that there can be many other aspects that may need to be stored in the data store, such as for page image information and to access right information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the description herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the description.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the description and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the description as set forth in the claims.

Other variations are within the spirit of the present description. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this description are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
    an inventory holder including a plurality of sides, at least a first side of the plurality of sides including a plurality of compartments configured to receive one or more inventory items;
    an image projection device oriented in a first direction and configured to project information on the first side of the plurality of sides when the first side is orientated towards the image projection device;
    an image capture device oriented in a second direction that opposes the first direction, the image capture device configured to capture images of a human head and a shadow cast by the human head obstructing at least a portion of the information projected by the image projection device on the first side when the human head is positioned between the image projection device and the image capture device, the human head comprising two eyes; and
    a computing device configured to:
        instruct the image projection device to project a first user interface image on the first side, the first user interface image defined by a plurality of image characteristics comprising at least a hue value, a saturation value, and a brightness value;
        instruct the image capture device to capture a first image of the human head, the first image depicting the human head the two eyes, and the shadow;
        instruct the image capture device to capture a second image of the human head, the second image depicting the human head one or fewer eyes of the two eyes, and the shadow;
        compare the first image and the second image to determine a changed orientation of the human head with respect to the image projection device;
        receive position information indicating a position of the human head when the human head is in the changed orientation;
        generate, based at least in part on the changed orientation and the position, a second user interface image comprising a modified region by adjusting at least one of the hue value, the saturation value, or the brightness value in the modified region, the modified region corresponding in size and shape to the human head; and
        instruct the image projection device to project the second user interface image on the first side.

2. The system of claim 1, wherein the first user interface image comprises at least one user interface component that highlights a compartment of the plurality of compartments.

3. The system of claim 1, wherein the human head further comprises at least a portion of a human operator who interacts with the inventory holder.

4. The system of claim 1, wherein instructing the image projection device to project the second user interface image on the first side comprises instructing the image projection device to project the second user interface image on the first side instead of the first user interface image.

5. The system of claim 1, wherein the modified region of the second user interface image comprises at least one user interface component that has a reduced brightness value compared to unmodified regions of the second user interface image.

6. A computer-implemented method, comprising:
    receiving image information indicating that a head, comprising two eyes disposed on a first side of the head, is located between an image projection device oriented in a first direction and a background, the head casting a shadow by obstructing at least a portion of a first image projected on the background by the image projection device;
    capturing, using an image capture device oriented in a second direction that opposes the first direction, one or more images that depict the shadow and the two eyes in various orientations with respect to the image capture device;
    determining, based at least in part on the one or more images, an initial orientation of the head that presents the first side of the head to the image capture device;
    determining, based at least in part on the one or more images, a rotated orientation of the head that presents at least a portion of a second side of the head to the image capture device, the first side being different from the second side;
    receiving position information indicating a position of the head when the head is in the rotated orientation; and instructing, based at least in part on the rotated orientation of the head and the position of the head, the image projection device to project a second image toward the background, at least one image characteristic of the second image adjusted in a modified region associated with the head.

7. The computer-implemented method of claim 6, wherein the head further comprises a position sensor connected thereto, the position sensor configured to transmit the position information.

8. The computer-implemented method of claim 6, wherein the image information is obtained at least in part by:
capturing, using a different image capture device oriented in the first direction, one or more other images that depict the head and the background; and
determining, based at least in part on the one or more other images, a boundary of the head with respect to the background.

9. The computer-implemented method of claim 8, further comprising generating the second image to include the modified region that corresponds to the boundary of the head, and wherein instructing the image projection device to project the second image toward the background comprises instructing the image projection device to project the second image with the modified region.

10. The computer-implemented method of claim 6, wherein:
the head further comprises one or more radio-frequency antennas connected thereto, the one or more radio-frequency antennas configured to output radio-frequency information useable to determine the initial orientation and the rotated orientation of the head with respect to one or more radio-frequency readers; and
determining the initial orientation and determining the rotated orientation are further based at least in part on the radio-frequency information.

11. The computer-implemented method of claim 6, wherein:
the head comprises a plurality of heads; and
the method further comprises generating the second image to include a plurality of modified regions corresponding to the plurality of heads.

12. The computer-implemented method of claim 6, wherein the position information comprises:
depth sensor information indicating the position of the head with respect to a depth sensing device;
image depth information indicating the position of the head with respect to the image capture device that includes depth sensing;
motion sensor information indicating the position of the head with respect to a motion sensing device; or
light sensor information indicating the position of the head with respect to a light sensing device.

13. The computer-implemented method of claim 6, wherein:
the background comprises an inventory holder comprising a plurality of compartments configured to receive items; and
the second image comprises an image component that highlights a compartment of the plurality of compartments.

14. The computer-implemented method of claim 13, wherein adjusting the at least one image characteristic of the second image in the modified region associated with the head comprises adjusting at least one of a hue value, a saturation value, or a brightness value in the modified region of the second image corresponding to the head.

15. The computer-implemented method of claim 6, wherein:
the image projection device is oriented such that a first field of view of the image projection device includes at least a portion of the background; and
the image capture device is oriented such that a second field of view of the image capture device excludes the background.

16. The computer-implemented method of claim 6, wherein:
determining the initial orientation of the head comprises determining, based at least in part on a first subset of images of the one or more images, the initial orientation, the two eyes being depicted in the first subset of images of the one or more images; and
determining the rotated orientation of the head comprises determining, based at least in part on a second subset of images of the one or more images, the rotated orientation, fewer than two of the two eyes being depicted in the second subset of images of the one or more images.

17. One or more non-transitory computer-readable storage media storing computer-executable instructions that, when executed by a processor, configure a computing device to perform operations comprising:
receiving, from a sensor oriented in a first direction, sensor information indicating a head is located between a background and an image projection device, the image projection device being oriented in a second direction that opposes the first direction and the head casting a shadow by obstructing at least a portion of a first image projected on the background by the image projection device;
determining, based at least in part on the sensor information, an initial orientation of the head, the head presenting a first side of the head to the image projection device in the initial orientation, the head comprising two eyes disposed on a second side of the head;
determining, based at least in part on the sensor information, a rotated orientation of the head, the head presenting at least a portion of the second side of the head to an image capture device in the rotated orientation, the first side being different from the second side;
receiving position information indicating a position of the head when the head is in the rotated orientation; and
instructing, based at least in part on the rotated orientation of the head and the position of the head, the image projection device to project a second image toward the background, at least one projection characteristic of the second image adjusted in a region associated with the head and corresponding to the shadow.

18. The one or more non-transitory computer-readable storage media of claim 17, wherein the at least one projection characteristic comprises at least one of a hue value, a saturation value, or a brightness value.

19. The one or more non-transitory computer-readable storage media of claim 17, wherein the sensor is attached to or associated with the background.

20. The one or more non-transitory computer-readable storage media of claim 17, wherein the operations further comprise determining, based at least in part on the sensor information, movement information indicating an estimated future position of the head relative to the image projection device, and wherein instructing the image projection device to project the second image toward the background comprises modifying the second image based at least in part on the estimated future position of the head.

* * * * *